(12) United States Patent
Venkataramu

(10) Patent No.: US 8,588,850 B1
(45) Date of Patent: Nov. 19, 2013

(54) GENERATION AND TRANSMISSION OF EVENT MESSAGES INSIDE A MOBILE STATION INFORMING STATUS OF A DATA CALL CONNECTION

(75) Inventor: Praveen Venkataramu, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 303 days.

(21) Appl. No.: 13/036,589

(22) Filed: Feb. 28, 2011

(51) Int. Cl.
*H04B 1/38* (2006.01)

(52) U.S. Cl.
USPC .......................... 455/558; 455/67.11

(58) Field of Classification Search
USPC .............................. 455/558, 67.11
See application file for complete search history.

(56) References Cited

U.S. PATENT DOCUMENTS

2010/0232386 A1* 9/2010 Dong ........................... 370/329
2012/0178366 A1* 7/2012 Levy et al. .................. 455/41.1

* cited by examiner

*Primary Examiner* — Justin Lee

(57) ABSTRACT

Event messages indicating events in the life of data call connections for a mobile station are automatically provided by a user device of the mobile station to a mobile client application or a UICC contained in the mobile station to inform the mobile client application or UICC of the status of a data call connection. The event messages include data call connected, data call disconnected, and data call in-progress messages, which are provided without being triggered by the UICC. The data call connected event message is generated after a successful data attach procedure. The data call disconnected event message is generated when a previously established data call connection is lost or when the mobile station is in limited service areas. The data call in-progress event message is generated when a data call connection is requested while another data call connection is already in progress.

19 Claims, 5 Drawing Sheets

GENERATION AND TRANSMISSION OF EVENT MESSAGES INSIDE A MOBILE STATION INFORMING STATUS OF A DATA CALL CONNECTION

TECHNICAL FIELD

The present subject matter relates to techniques and equipment to generate and send event messages by a baseband processor or other part of the user device of a mobile station, to a mobile client application or a Universal Integrated Circuit Card (UICC) contained in the mobile station, informing the mobile client application or the UICC of status of a data call connection to a network by means of event type and its associated parameter fields in the event messages.

BACKGROUND

Long Term Evolution (LTE) technology is one of the latest technologies in the evolution from the current 3G cellular technology to 4G cellular technology (e.g., GSM to UMTS to HSPA to LTE, or CDMA to LTE). The LTE technology provides, among other advantages, increased downlink and uplink peak data rates, scalable bandwidth, improved spectral efficiency, Internet Protocol (IP) network, and support of a wide range of terminal devices. It also provides an IP-optimized mobile network for various types of communications services.

A mobile station in a LTE technology environment contains a Universal Integrated Circuit Card (UICC) which is similar to Subscriber Identification Module (SIM) in a GSM network. The UICC is often considered as a smart card used in a mobile station to hold and distribute security related information, for example, the identity or identities of the mobile station used for accessing one or more types of mobile networks.

In a LTE network environment, currently there is a "trial-and-error" approach, based on polling, which is adopted by a UICC in a mobile station in order for the UICC to determine the status of a data call connection with a network. For example, during a boot-up or registration procedure, a UICC in a mobile station polls the user device portion of the mobile station to determine whether a data call connection has been established to the network for services. Between each polling of the user device, the UICC waits for a predetermined or random interval of time before initiating another polling operation. The UICC continues this process until it determines that a data call connection is established. This procedure is used because currently no indication or information is provided to the UICC by the mobile station, informing the UICC of the status of a data call connection to the network. This trial-and-error approach adopted by the UICC results in shortening a battery life of a mobile station and increasing a wait time for the user or subscriber before activation of the UICC and prior to his or her use of the mobile station, because the UICC may continue to poll the user device repeatedly to determine the status of a data call connection to the network. Further, there might be situations where retry counters in the UICC would be exhausted due to continuous polling when the network is not available, thereby resulting in no service to the user or subscriber even when the network becomes available later.

Hence, a need exists for an improved technique for the UICC to determine the status of a data call connection to a network, for example, for alleviating the shortening of the battery life of a mobile station and/or decreasing the wait time for the user or subscriber due to the polling based trial-and-error approach.

SUMMARY

The present teachings in this application herein alleviate one or more of the above noted problems with the UICC determination of status of a data call connection to a network. In the examples, a set of event signal messages are defined and used to inform the UICC of events in the life of data call connections for the mobile station via a mobile communication network.

As a result, there is no need for the UICC to adopt and use the trial-and-error method to determine status of a data call connection to a network. For example, battery life of a mobile station may not be so shortened by excessive polling. The present teachings may also result in a shorter predetermined customer wait time prior to the customer's use of the mobile station. For example, currently the customer wait time prior to the customer's use of the mobile station may vary from 1 minute to 20 minutes. However, because of the present teachings the customer wait time can be predetermined and reduced to 30 seconds to 2 minutes, thereby increasing customer satisfaction.

In an example of the present teachings, a mobile station includes a baseband processor, a UICC, one or more user interface elements, and a processor which is coupled to the baseband processor, the UICC and the one or more user interface elements. The processor is configured to control operations of the mobile station. The baseband processor is configured to generate event messages indicating occurrence of different types of events in the life of data call connections for the mobile station via a mobile communication network, and the UICC is configured to receive the event messages from the baseband processor.

At a high level, a UICC in a mobile station includes an interface for exchange of messages with a user device portion of the mobile station, a memory for storing information, and a processor coupled to the interface and the memory. The processor of the UICC is configured to monitor the interface for arrival of event messages indicating occurrence of events in the life of data call connections for the mobile station via a mobile communication network when the event messages are sent from the user device without being triggered by the UICC, receive the event messages from the user device via the interface, and process the received event messages thereafter for operation of the UICC (e.g., based on contents of the event messages, the processor of the UICC determines status of the data call connections for the mobile station). Hence, because the processor of the UICC monitors and/or receives via the interface the event messages generated by the user device (or its baseband processor) upon the occurrence of each detected event in the life of the data call connections and without polling of the user device or its baseband processor by the UICC, the UICC can determine status of the data call connections for the mobile station without using a trial-and-error method or otherwise triggering the user device or its baseband processor to obtain the status information.

In the examples, a user device may be configured to form a mobile station together with a UICC. The user device includes at least one processor, a message interface for communication between the at least one processor and the UICC. The at least one processor is configured to detect occurrence of events in the life of data call connections for the mobile station via a mobile communication network, and generate and supply to the UICC, through the message interface and without being triggered by the UICC, event messages indicating the occurrence of the detected events. Here, the at least one processor may include a baseband processor for processing digitized representation of baseband signals for radio frequency communication with a mobile communication network.

As discussed earlier, the event messages generated by the user device (e.g., by the baseband processor in the user device) indicate events in the life of data call connections to a network. Such event messages may include various information such as event type and associated information of a data call connection. Three exemplary types of event messages are discussed: a data call connected event message, a data call disconnected event message, and a data call in-progress event message. The data call connected event message is generated and sent to the UICC when the mobile station successfully completes a data attach procedure with a mobile communication network. The data call disconnected event message is generated and sent to the UICC when the mobile station loses a previously established data call connection with a mobile communication network. The data call in-progress event message is generated and sent to the UICC when the UICC or application software requests a data call when another data call connection with a mobile communication network is already in progress. Further, each event message contains its associated information, by means of parameter fields, informing the UICC of detailed status of a data call connection with a mobile communication network. For example, associated information may include any or all of: type of network (e.g., LTE, IMS, eHRPD), APN name (e.g., ADMIN, INTERNET, APP), type of IP connection (e.g., IPv4, IPv6), etc.

It is also contemplated that the present teachings may be used in conjunction with other communication strategies such as polling, trial-and-error based, etc. between the user device or its baseband processor and the UICC.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1:
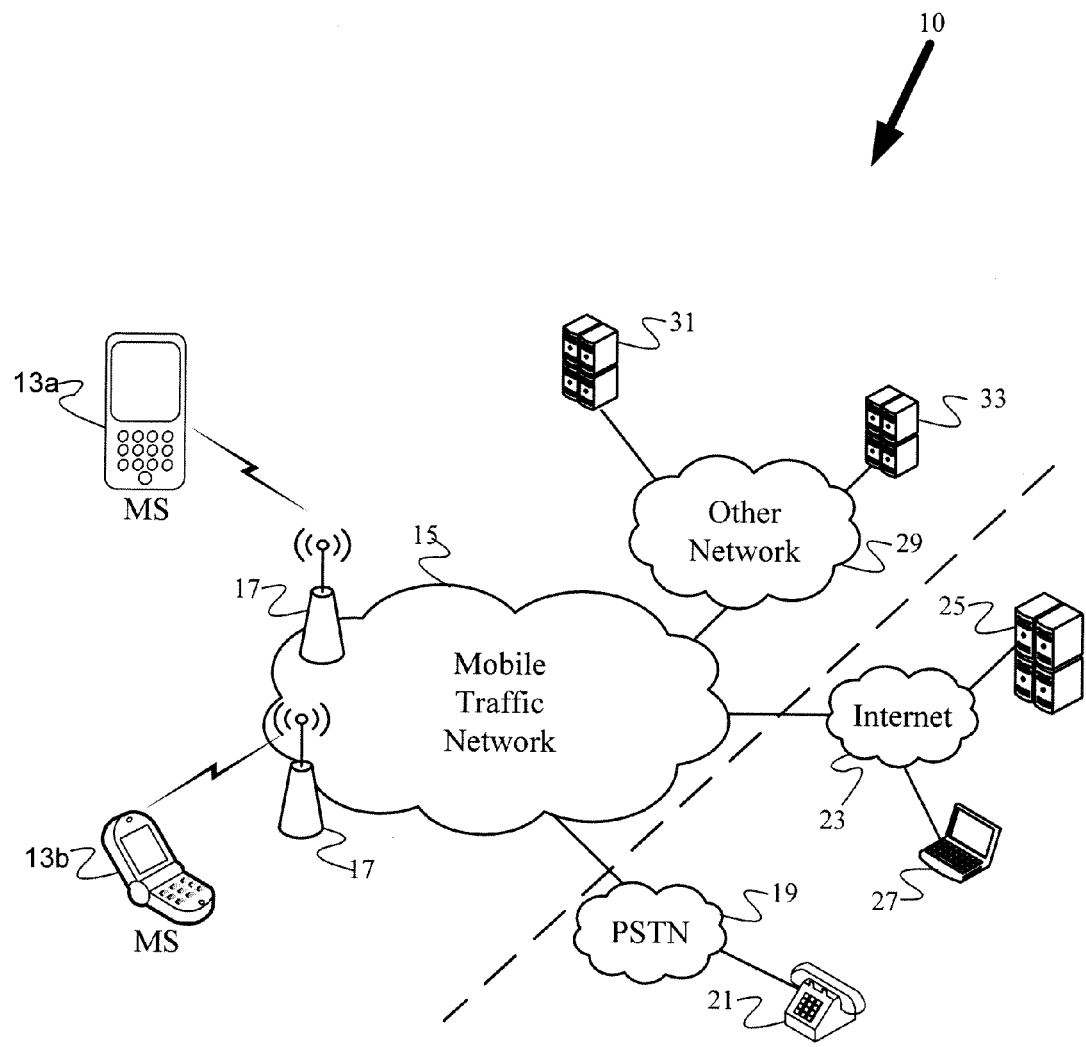
FIG. 1 is a general diagram illustrating a system offering a variety of mobile communication services to mobile stations or users.

FIG. 1 is a general diagram illustrating a system 10 offering a variety of mobile communication services to mobile stations or users. The example shows simply two mobile stations 13a and 13b as well as a mobile communication network 15. The stations 13a and 13b are examples of mobile stations that may be used for data services. The network 15 provides mobile wireless communications services to those stations as well as to other mobile stations (not shown), for example, via a number of base stations 17. The present techniques may be implemented in any of a variety of available mobile networks 15 and/or on any type of mobile station compatible with such a network 15, where the mobile station uses a Universal Integrated Circuit Card (UICC) or the like, and the drawing shows only a very simplified example of a few relevant elements of the network 15 for purposes of discussion.

The wireless mobile communication network 15 might be implemented as a network conforming to different cellular standards, such as the Long Term Evolution (LTE) standard or other standards used for public mobile wireless communications. The LTE standard supports a full Internet Protocol (IP) network architecture and is designed to support voice and data in the packet domain. That is, in a LTE network voice calls are treated as data packets and get via Voice-over-IP (VoIP) services. The mobile stations 13 are capable of voice telephone communications through the network 15, and for various data services, the exemplary devices 13a and 13b are capable of data communications through the particular type of network 15 (and the users thereof will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 generally offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications and/or any an application purchased on-line via a network can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers include a number of base stations represented in the example by the base stations 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application servers 31. If the mobile service carrier offers various services, the services may be hosted on a carrier operated application server 31, for communication via the networks 15 and 29. Alternatively, the services may be provided by a separate entity (alone or through agreements with the carrier), in which case, the service may be hosted on an application server such as server 25 connected for communication via the networks 15 and 23. Server such as 25 and 31 may provide any of a variety of common application or service functions in support of or in addition to an application program running on the mobile station 13.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13. Upon successful authentication, the server 33 informs the server application 31, which in turn provides access to the service via data communication through the various communication elements (e.g. 29, 15 and 17) of the network 10. A similar authentication function may be provided for various mobile service(s) offered via the server 25, either by the server 33 if there is an appropriate arrangement between the carrier and the operator of server 24, by a program on the server 25 or via a separate authentication server (not shown) connected to the Internet 23.

Those skilled in the art presumably are familiar with the structure, programming and operations of the various type of mobile stations. However, for discussion purposes, it may be useful to consider the functional elements/aspects of an exemplary mobile station 13a at a high-level.

Figure 2:
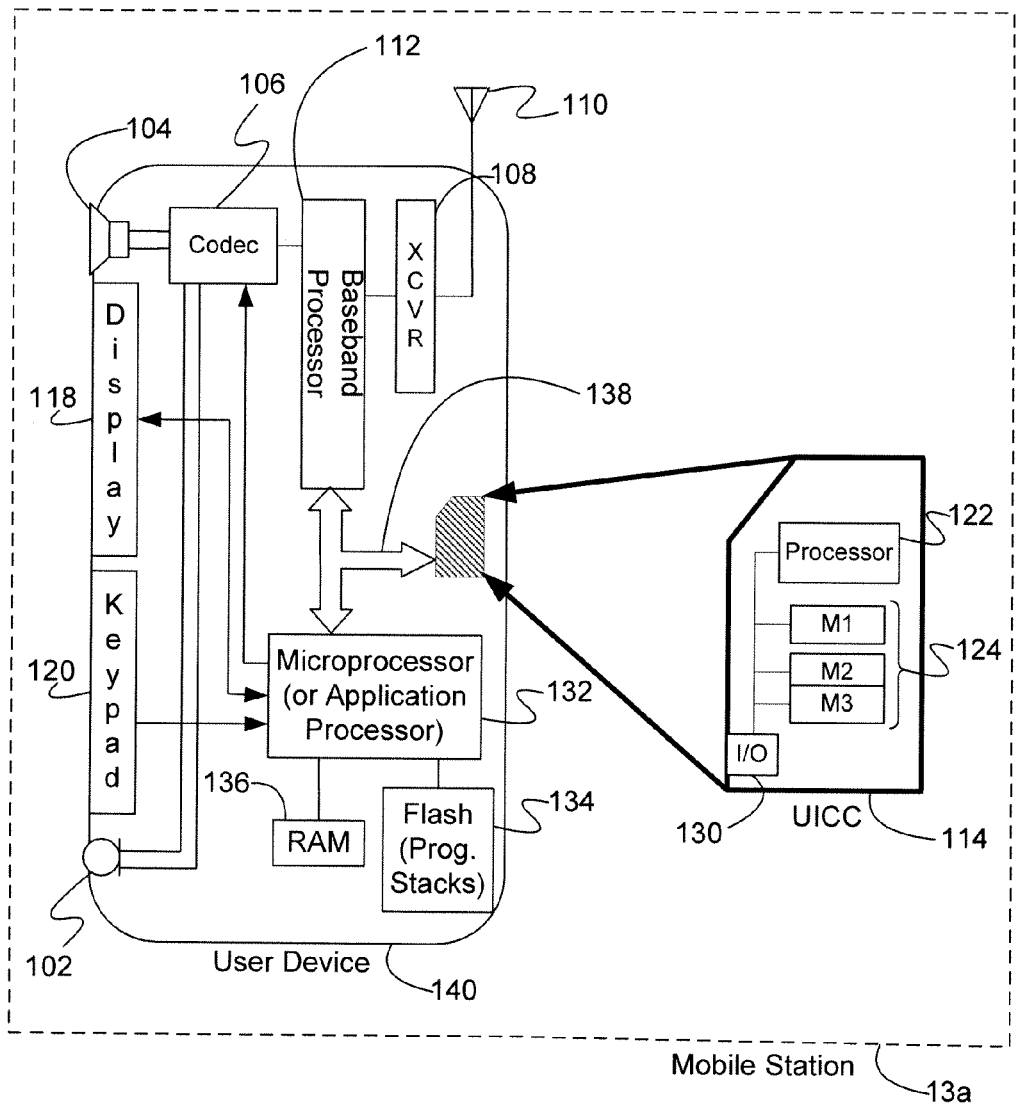
FIG. 2 illustrates a simplified, high level function block diagram of an exemplary mobile station.

For purposes of such a discussion, FIG. 2 illustrates a high level simplified function block diagram of an exemplary mobile station 13a. Specifically, it provides a block diagram illustration of an exemplary non-touch screen mobile station 13a. Touch screen implementations are also contemplated. Although the mobile station 13a may be a smart-phone or may be incorporated into another device, such as a personal digital assistant (PDA) or the like, for discussion purposes, the illustration shows the mobile station 13a in the form of a handset.

The mobile station 13a includes a Universal Integrated Circuit Card (UICC) 114 inside. The rest of the mobile station 13a, e.g., without the UICC 114, may be thought of as a user device 140. The user device 140 and the UICC 114 communicate with each other via communication interfaces 138. That is, they have compatible interfaces to allow exchange of messages or other data. The communication interfaces 138 may be in the form of a serial link or connection, high-speed multiplexed bus, etc.

The handset example of the mobile station 13a functions as a normal digital wireless telephone station. For that function, the station 13a includes a microphone 102 for audio signal input and a speaker 104 for audio signal output. The microphone 102 and speaker 104 connect to audio coding and decoding circuitry (codec) 106. The codec 106 is a device that converts an analog signal to a digital signal, and another codec converts the digital signal back into an analog signal. For a voice telephone call, for example, the codec 106 provides two-way conversion between analog audio signals representing speech or other audio and digital samples at a compressed bit rate compatible with the digital protocol of wireless telephone network communications or voice over Internet Protocol (VoIP) communications.

For wireless communications, the mobile station 13a also includes at least one digital transceiver (XCVR) 108. Today, the mobile station 13a would be configured for digital wireless communications using one or more of the common network technology types. The concepts discussed here encompass examples of the mobile station 13a utilizing any digital transceivers that conform to current or future developed digital wireless communication standards such as 4G and beyond. The mobile station 13a may also be capable of analog operation via a legacy network technology.

The transceiver 108 provides two-way wireless communication of information, such as speech samples and/or digital information, in accordance with the technology of the network 15. The transceiver 108 includes both a Radio Frequency (RF) transmitter and a RF receiver circuitry, including filters, low-noise amplifiers, oscillator, mixer, etc. The transceiver 108 performs down-conversion of receive signals from RF to baseband frequency, and up-conversion of transmit signals in the opposite direction. The Transceiver 108 connects through RF send and receive amplifiers (not separately shown) to an antenna 110.

The mobile station 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input/output elements of the graphical user interface (GUI), for multimedia (e.g., audio and/or video) communications. Of course, other user interface elements may be used, such as a trackball, as in some types of PDAs or smart phones. In addition to normal telephone and data communication related input/output (including message input and message display functions), the user interface elements also may be used for display of menus and other information to the user and user input of selections.

A baseband processor or baseband module 112 is an integrated circuit (IC) that performs various signal processing functions, including processing of digitized information from and to the transceiver 108 within mobile stations. Depending on the system architecture of a mobile station 13a, the digital signal processing functions of the baseband processor 112 may include voice coding/decoding, channel coding/decoding, equalization, digital modulation/demodulation, etc. in accordance with the technology of the network 15. For example, in order to lower a bill of material and reduce power consumption, the transceiver 108 may be integrated with the digital baseband processor 112 into a single chip as a System on Chip (SoC) solution.

At a high level, for transmission of data, the baseband processor 112 receives outbound data from a microprocessor 112 or other components and provides digitally processed transmit data to the transceiver 108 for transmitting them through RF send amplifier (not shown) to an antenna 110. Likewise, for reception of data, the baseband processor 112 receives receive data from the transceiver 108 via RF receive amplifier (not shown) and an antenna 110, processes them and/or outputs the digitally processed data to various components such as display 118, speaker 104, microprocessor 132, application software, etc. In addition, the baseband processor 112 generates, sends and/or receives control signals to and from various components of the mobile station 13a, including a UICC 114 inside the mobile station 13a via communication interface 138 and Input/Output (I/O) port 130 of the UICC 114. The various components may include mobile client applications such as an Open Mobile Alliance-Device Management (OMA-DM) client, a Skype client, etc. running on the microprocessor 132 in the mobile station 13a.

UICCs 114 are standardized, although they may be provided in different form factors. UICCs 114 may also be implemented in different manners such as removable cards, or embedded in a device (e.g., being soldered onto the Printed Circuit Board (PCB) of the device). Further, UICCs 114 provide many benefits to a carrier as well as subscribers, including portability, security, trust, etc.

FIG. 2 conceptually illustrates a UICC 114 comprising a processor or microprocessor 122, its own data storage 124 (e.g., RAM, ROM, EEPROM), and I/O circuit 130. The memory M1 is a Random Access Memory (RAM) or a Static Random Access Memory (SRAM) for data processing. The memory M2 is a non-volatile memory of the Read Only Memory (ROM) type or of the flash type, and it may include the operating system of the UICC 114. The memory M3 is a non-volatile memory, such as an Electrically Erasable Programmable Read Only Memory (EEPROM) or a flash memory, for storing algorithms, keys, and credentials of the subscriber or user of the mobile station 13a. The I/O port 130 is an interface for exchanging messages with the user device portion 140 of the mobile station 13a including the baseband processor or module 112 or microprocessor 132. That is, the UICC 114 sends and receives messages via the I/O port 130 and communication interfaces 138, to and from user device (e.g., baseband processor 112) of the mobile station 13a. Here, for discussion purposes, the user device portion 140 of the mobile station 13a is the mobile station 13a without the UICC 114.

One role performed by the UICC 114 in a mobile station 13a is to authenticate the validity of the mobile station 13a to a network 15 when accessing the network 15, and in so doing, providing the integrity and security of subscriber's personal data. Depending on the type or types of mobile communication networks that the mobile station can access, the UICC 114 may run one or more applications such as Subscriber Identity (SIM), CDMA Subscriber Identity Module (CSIM), IP Multimedia Services Identity Module (ISIM), and Universal Subscriber Identity Module (USIM) applications. It may contain at least one of SIM, CSIM, and USIM applications for accessing a mobile network in accordance with different technology adopted by a carrier. For example, in a GSM network, the UICC runs a SIM application; in a CDMA network, the UICC 114 runs a CSIM application; in a 3G or UMTS network, the UICC runs a USIM application. In a LTE network, the UICC 114 may run a USIM or its variant application and/or an ISIM application. The ISIM application provides the mobile station 13a access to the IP multimedia Subsystem (IMS) via any IP access network, by providing a set of IMS security data and performing functions for IMS access, such as mutual authenticating and provisioning for IMS-based services.

The UICC 114 may also store applications for both carrier and subscriber use. For example, the UICC 114 may contain subscriber credentials, network and service configuration data, services application programs such as roaming, branding, etc. Being removable, the UICC 114 makes it possible to easily transfer subscriber information from device to device, enabling seamless management of subscriber information exchange, such as transferring contacts and preferences from one device to another, while providing secure access to the network 15. Further, once the UICC 114 has been authenticated and activated, it can be remotely managed via Over-the- Air (OTA) technology by various servers which perform, among others, functions such as remotely updating the card and/or subscriber profiles and downloading/deleting application applets on the UICCs. For example, for roaming of mobile stations, the UICC 114 using OTA technology connects to a remote SIM OTA server for updating information related to their roaming agreements remotely, while making the transaction seamless to subscribers of the mobile stations 13.

A microprocessor or application processor 132 serves as a programmable controller for the mobile station 13a, in that it controls all operations of the mobile station 13a in accord with programming that it executes for all normal operations of the mobile stations. For example, the microprocessor 132 may manage application operation such as processing emails with images, playing video and audio, and supporting video telephony and similar multimedia applications. While running various applications for the user of the mobile station 13a, the microprocessor 132 may communicate at the same time with the baseband processor 112, via communication interface 138 (e.g., a serial connection or high speed multiplexed bus).

In the example, the mobile station 13a includes flash type program memory 134, for storage of various "software" or "firmware" program routines and mobile configuration settings, such as Mobile Directory Number (MDN) and/or Mobile Identification Number (MIN), etc. The mobile station 13a may also include a non-volatile random access memory (RAM) 136 as a working data processing memory. Of course, other storage devices or configurations may be added to or substituted for those in the example. In a present implementation, the flash type program memory 134 stores firmware such as a boot routine, device driver software, an operating system, call processing software and vocoder control software, and any of a wide variety of other applications, such as client browser software and short message service software. The memories 134, 136 also store various data, such as telephone numbers and server addresses, downloaded data such as multimedia content, and various data input by the user. Programming stored in the flash type program memory 134, sometimes referred to as "firmware," is loaded into and executed by the microprocessor 132.

As outlined above, the mobile station 13a includes at least one processor, and programming stored in the flash memory 134 configures the at least one processor so that the mobile station 13a is capable of performing various functions, including in this case the functions involved in the technique for authentication and/or registration, data attach, or various types of data call connection to a network and communication of associated event messages with the UICC.

Figure 3:
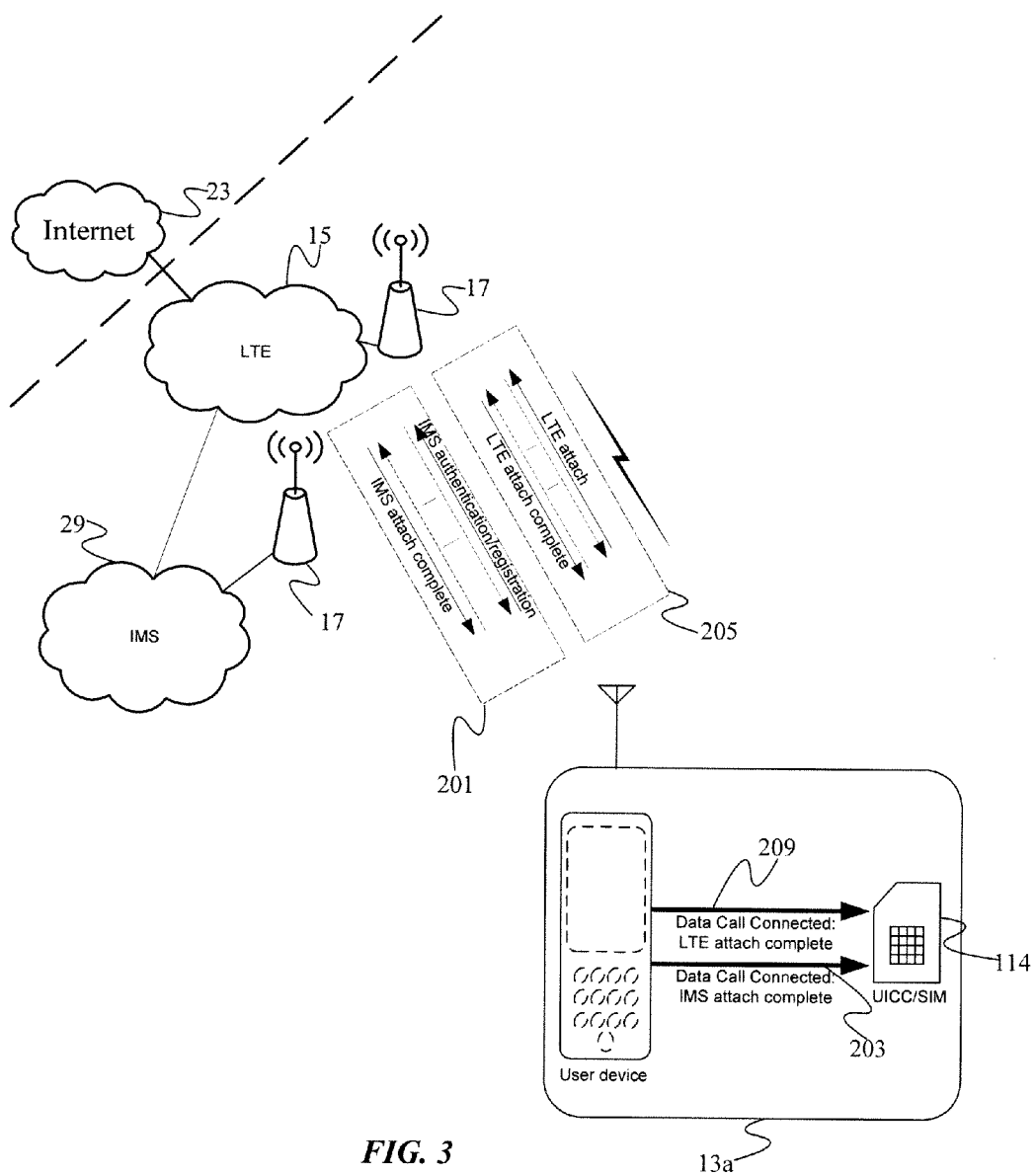
FIG. 3 illustrates a high level, conceptual diagram showing wireless communication between a mobile station and a network, and examples of event message communications between user device of the mobile station and a UICC residing in the mobile station.

FIG. 3 illustrates a high level, conceptual diagram showing wireless communication between a mobile station 13a and a network 15, and examples of event message communications between user device of the mobile station 13a and a UICC 114 residing in the mobile station 13a. Although in the examples below event messages are generated and sent to a UICC 114 residing in a mobile station 13a, the event messages may be generated and sent to other mobile client applications such as Open Mobile Alliance-Device Management (OMA-DM) clients, Skype clients, etc. running on a processor or microprocessor 132 of the mobile station 13a.

In FIG. 3, message implementations are illustrated in a context of a mobile station 13a connecting to a data network. For discussion purposes, illustrations are only conceptual leaving out many details of signaling over the air between a mobile station and a mobile communication network. FIG. 3 shows two examples of data call attach procedures during operation of the mobile station 13a for wireless communication. In a LTE network, all-IP network architecture of LTE technology provides that all information, including voice, is treated as data packets. That is, even voice gets treated as data packets and gets Voice-Over-IP (VoIP) services. Hence, all communications require a data session attachment or a data call connection through the LTE network 15. For example, when a mobile station 13a is powered up, the mobile station 13a goes through a sequence of events for its registration with a LTE network 15 for services. First, the mobile station 13a begins its registration by initiating a data attach procedure 201 with an authentication server or IP Multimedia Subsystem (IMS) network 29. In accordance with the technology adopted by the network, a series of exchanges of messages occurs between the mobile station 13a and the network 29 and/or network 15. If the mobile station 13a is successfully authenticated, then the mobile station 13a receives a data attach message, e.g., an IMS attach complete message, from the base station 17. Upon receiving the IMS attach complete message, the mobile station 13a or its baseband processor 112 then generates an event signal or message 203, as part of Packet Data Network (PDN) connectivity events, to the UICC 114 in the mobile station 13a, thereby informing the UICC 114 that the mobile station 13a is successfully authenticated and attached to the IMS network 29 and the data attach procedure 201 is completed.

Figure 5:
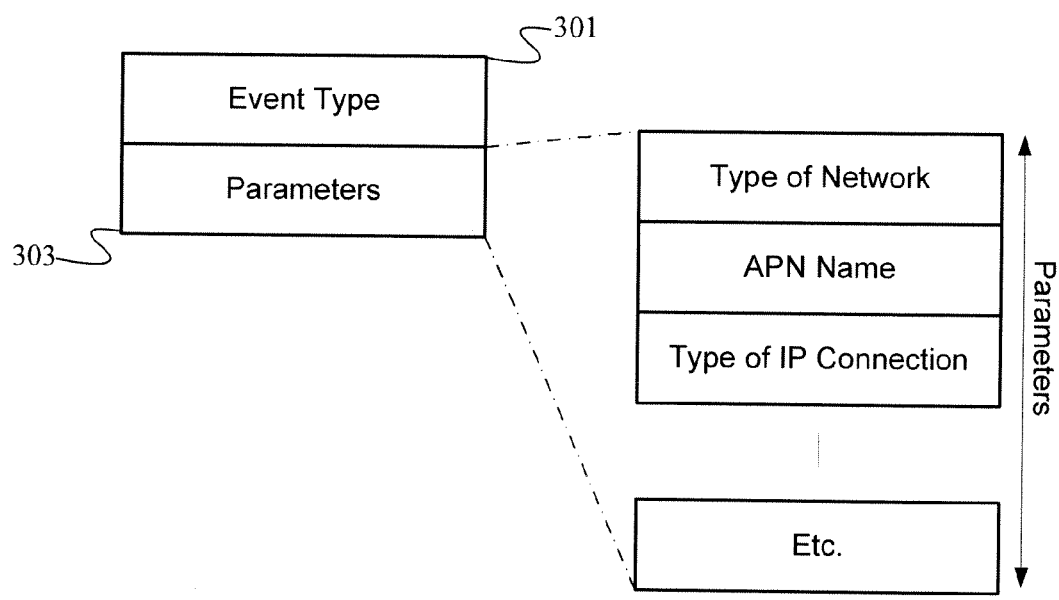
FIG. 5 illustrates an exemplary format of event signal messages embodying present teachings.

In the example, upon completing the data attach procedure (e.g., IMS attach procedure) 201, the user device portion of the mobile station 13a (or baseband processor 112) generates an event signal message 203 to the UICC 114 in the mobile station 13a, informing the UICC 114 that a data call connection is established with a IMS network. The UICC 114 is configured to monitor its I/O port 130 or wait for arrival of event messages indicating occurrence of one or more types of events in the life of call connections for the mobile station via a mobile communication network. Specifically, the event signal message 203, having a message format as shown later in FIG. 5, is generated by the baseband processor 112 and transmitted as a message, via internal communication interface or connection 138, to the I/O port 130 of the UICC 114 in the mobile station 13a. The event signal message 203 includes various information associated with the data call connection established, such as a type of event (i.e., Data Call Connected), a type of network (e.g., IMS), APN name (e.g., NONE), a type of IP connection (e.g., IPv4 or IPv6), etc. Hence, based on the content of the received event message, which is generated by the baseband processor 112 after detecting a data call connection to the IMS network 29 via the received IMS attach complete message, the UICC 114 can determine status of the data call connection to the IMS network 29 without polling the user device portion of the mobile station 13a or its baseband processor 112.

Having successfully completed the above data attach procedure (e.g., IMS attach procedure) 201, the mobile station 13a now begins another data attach procedure (e.g., LTE attach procedure) 205 for making a data call connection to a LTE network 15. After exchange of a series of messages over the air between the mobile station 13a and the LTE network 15, upon a successful data attach procedure, the mobile station 13a receives a LTE attach complete message for the LTE network 15. Upon receiving the LTE attach complete message, the mobile station 13a (or its baseband processor 112) then generates an event signal or message 209, as part of Packet Data Network (PDN) connectivity events, to the UICC 114 in the mobile station 13a, thereby informing the UICC 114 that the mobile station 13a is successfully attached to the LTE network 29 and the data attach procedure 201 is completed.

In the example, upon successfully completing the LTE attach procedure 205, the user device portion of the mobile station 13a (or baseband processor 112) will generate an event message 209 to the UICC 114 in the mobile station 13a, informing the UICC 114 that a data call connection is established with the LTE network. The UICC 114 is configured to monitor its I/O port 130 or wait for arrival of event messages indicating occurrence of one or more types of events in the life of call connections for the mobile station. Specifically, the event signal message 209, having a message format as shown later in FIG. 5, is generated by the baseband processor 112 and transmitted as a message, via internal interface or connection, to the I/O port 130 of the UICC 114 in the mobile station 13a. The event signal message 209 will include various information in connection with the data call connection established, such as a type of event (i.e., Data Call Connected), a type of network (e.g., LTE), APN name (e.g., NONE), a type of IP connection (e.g., IPv4 or IPv6), etc. Hence, based on the content of the received event message, which is generated by the baseband processor 112 after detecting a data call connection to the LTE network via the received LTE attach complete message, the UICC 114 can determine status of the data call connection to the LTE network without polling the user device portion of the mobile station 13a or its baseband processor 112.

Figure 4:
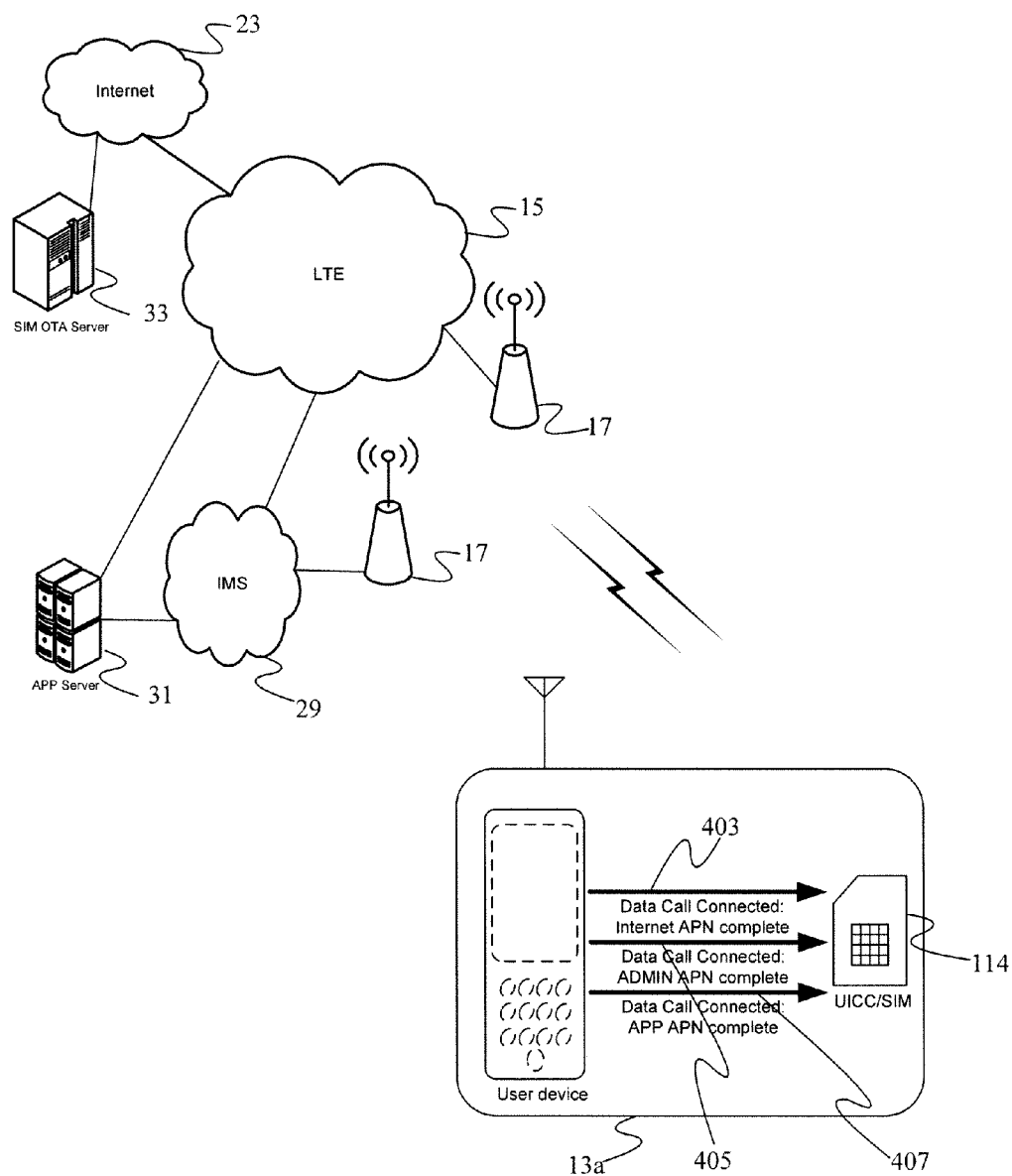
FIG. 4 illustrates a simplified, high level diagram showing signaling between a mobile station and various network elements, and examples of event messages provided by user device of the mobile station to a UICC residing in the mobile station.

FIG. 4 illustrates a simplified, high level diagram showing signaling between a mobile station 13a and various network elements, and other examples of event messages provided to a UICC 114 residing in the mobile station 13a.

Once the mobile station 13a is connected to a data traffic network (e.g., a LTE network), the mobile station 13a may establish a variety of Access Point Name (APN) connections to various network elements or nodes for services. Generally, in an all Internet Protocol (IP)-based network, when a subscriber desires to make a data call connection via a network 15 to an external network or node, an appropriate type of APN is selected. Each APN identifies the network to connect to and the address space where the IP address belongs. For the purpose of illustration, the discussion below is limited to three types of APN connections: Administrative APN, Internet APN, and Application APN connections. The disclosed techniques may be applied to other types of APN connections. Note that in the following discussion FIG. 4 serves as a conceptual illustration of how the mobile station 13a would establish each APN type connection.

For example, for establishing an Internet APN connection for IP based services such as web browsing, etc, the following sequence of events may occur after the mobile station 13a is attached to the LTE network 15. After the mobile station 13a is attached to the LTE network 15, the LTE network 15 establishes a connection to Internet 23 and subsequently obtains a valid IP address for the mobile station 13a, thereby establishing the Internet APN connection between the mobile station 13a and the Internet 23. Upon successfully establishing the Internet APN connection, user device of the mobile station 13a, e.g., the baseband processor 112, generates an event message 403, as part of APN connectivity event, to the UICC 114 in the mobile station 13a, informing the UICC 114 that an Internet APN type connection has now been established.

In the example, the event message 403, having a message format as shown later in FIG. 5, is generated by the baseband processor 112 and sent as a message, via internal interface or connection, to the I/O port 130 of the UICC 114 in the mobile station 13a. The UICC 114 is configured to monitor its I/O port 130 or wait for arrival of event messages indicating occurrence of one or more types of events in the life of call connections for the mobile station. Specifically, the event message 403 will include various information associated with the data call connection established, including event type (e.g., Data Call Connected), a type of network (e.g., LTE), APN name (e.g., INTERNET), a type of IP connection (e.g., IPv4 or IPv6), Quality of Service (QoS), etc. Hence, based on the content of the received event message which is generated by the baseband processor 112, the UICC 114 can determine status of an Internet APN connection to the Internet 23 without polling the user device portion of the mobile station 13a or its baseband processor 112.

As another example, for establishing an Administrative APN connection for carrier specific administrative functions such as updating subscriber profiles, etc., the following sequence of events may occur. The UICC 114 in the mobile station 13a sends a request to the user device portion of the mobile station 13a for establishing an Administrative APN connection, e.g., an Administrative APN connection to a SIM OTA server 33. The mobile station 13a then attaches to a LTE network 15, if not already attached. The LTE network 15 establishes a connection to the Internet 23. The Internet 23 then establishes an APN connection to a carrier's or service provider's SIM OTA server 33, thereby establishing a dedicated Administrative APN connection from the mobile station 13a to the SIM OTA server 33. After successfully establishing the Administrative APN connection to the SIM OTA server 33, the baseband processor 112 of the mobile station 13a then generates an event message 405, as part of APN connectivity event, to the UICC 114 in the mobile station 13a, informing the UICC 114 that the Administrative APN connection has now been successfully established for services.

In this example, the event message 405, having a message format as shown later in FIG. 5, is generated by the baseband processor 112 and sent as a message, via internal interface or connection, to the I/O port 130 of the UICC 114 in the mobile station 13a. The UICC 114 is configured to monitor its I/O port 130 or wait for arrival of event messages indicating occurrence of one or more types of events in the life of call connections for the mobile station. Specifically, the event message 405 will include various information associated with the data call connection established, including event type (e.g., Data Call Connected), a type of network (e.g., LTE), APN name (e.g., ADMIN), a type of IP connection (e.g., IPv4 or IPv6), etc. Hence, based on the content of the received event message which is generated by the baseband processor 112, the UICC 114 can determine status of an ADMIN APN connection to the SIM OTA server 33 without polling the user device portion of the mobile station 13a or its baseband processor 112.

For establishing an Application APN connection for application services, the following sequence of events may occur. The mobile station 13a attaches to a LTE network 15, if not already attached. Then, the mobile station 13a initiates an APP APN connection to an IMS network 29. After a successful establishment of the Application APN connection, the baseband processor 112 of the mobile station 13a then generates an event message 407, as part of APN connectivity event, to the UICC 114 in the mobile station 13a, informing the UICC 114 that the Application APN connection has been successfully established for application specific services In this latest example, the event message 405, having a message format as shown later in FIG. 5, is generated by the baseband processor 112 and sent as a message, via internal interface or connection, to the I/O port 130 of the UICC 114 in the mobile station 13a. The UICC 114 is configured to monitor its I/O port 130 or wait for arrival of event messages indicating occurrence of one or more types of events in the life of call connections for the mobile station. Specifically, the event message 405 will include various information associated with the data call connection established, including event type (i.e., Data Call Connected), a type of network (e.g., LTE), APN name (e.g., APP), a type of IP connection (e.g., IPv4 or IPv6), etc. Hence, based on the content of the received event message which is generated by the baseband processor 112, the UICC 114 can determine status of an Application APN connection to a network for application services without polling the user device portion of the mobile station 13a or its baseband processor 112.

FIG. 5 illustrates an exemplary format of event messages, in simplified block diagram form, showing only an exemplary format of an event message generated by the user device of the mobile station 13a, by the included baseband processor 112, and supplied to the UICC 114. The event messages inform the UICC of the status of a data call connection to a network 15. Depending upon specific implementation methods chosen by a person of ordinary skill in the art, message formats and/or order of information presented may vary.

For illustration purposes, FIG. 5 shows a format of event messages having at least two information fields: Event Type 301 and its associated Parameters 303. Event Type 301 may comprise at least three different types: Data Call Connected, Data Call Disconnected, and Data Call In-Progress.

Data Call Connected (or data call connected event message) is an event signal message which is generated by the user device portion of the mobile station 13a (e.g., by its baseband processor 112) and sent to the UICC 114 when a data attach procedure with a mobile communication network is successfully completed by the mobile station 13a. For example, this event signal message is generated by the user device during boot-up of the mobile station 13a or when, in case of a lost signal, the mobile station 13a re-establishes a data connection to a mobile communication network. Its associated Parameters field may contain various information about the data call connection established, including, for example, a type of network, APN name, a type of IP connection, duration, etc. Here, the type of network may be set to LTE, IMS, etc., depending upon the type of a network to which a data call connection is made. The APN name may be set to ADMIN, INTERNET, APP, etc., depending upon the type of APN connection established. The type of IP network may be set to IPv4 or IPv6, etc., depending upon the type of IP connection established.

Data Call Disconnected (or data call disconnected event message) is an event signal which is generated by the user device portion of the mobile station 13a (e.g., by its baseband processor 112) and transmitted via the interface(s) to the UICC 114 when a previously established data call connection is lost due to some reasons (e.g., poor signal strength) or when the mobile station 13a is found to be in limited service areas. Its associated Parameters field may contain various pieces of information, including a type of network, APN name, type of IP connection, duration, etc. In addition, Parameters field may include one of several reason codes, indicating the cause for such a disconnection to a mobile communication network. Here, the type of network may be set to LTE, IMS, etc., depending upon the type of a network to which a data call connection is previously made and lost. The APN name may be set to ADMIN, INTERNET, APP, etc., depending upon the type of APN connection established. The type of IP network may be set to IPv4 or IPv6, etc., depending upon the type of IP connection established.

Data Call In Progress (or data call in-progress event message) is an event signal message which is generated by the user device portion of the mobile station 13a (or its baseband processor 112) and given to the UICC 114 when the UICC 114 or application software requests a data call connection when a data call connection is already in progress. This event signal message notifies the application software or UICC 114 that the data connection established is being used. Its associated Parameters field may contain various pieces of information about the data call connection in progress, including a type of network, APN name, a type of IP connection, duration, etc. Here, the type of network may be set to LTE, IMS, etc., depending upon the type of a network to which a data call connection is made. The APN name may be set to ADMIN, INTERNET, APP, etc., depending upon the type of APN connection established. The type of IP network may be set to IPv4 or IPv6, etc., depending upon the type of IP connection established.

Aspects of the techniques of generating and/or processing event signals outlined above may be embodied in programming, e.g., for executing by a controller in the baseband processor 112, the microprocessor 132 and/or the processor 122 of the UICC 114. Program aspects of the technology may be thought of as "products" or "articles of manufacture" typically in the form of executable code and/or associated data that is carried on or embodied in a type of machine readable medium. "Storage" type media include any or all of the tangible memory of the UICC, mobile stations, computers, processors or the like, or associated modules thereof, such as various semiconductor memories, tape drives, disk drives and the like, which may provide non-transitory storage at any time for the programming. All or portions of the software may at times be communicated through the Internet or various other telecommunication networks. Such communications, for example, may enable loading of the software from one computer or processor into another, for example, from a server or host computer of the service provider into the appropriate memory of the user device and/or memory of the UICC. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is also contemplated that the present teachings may be used in conjunction with other communication strategies such as polling, trial-and-error based, etc. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

APN—Access Point Name
BTS—Base Transceiver System
CDMA—Code Division Multiple Access
CD-ROM—Compact Disk-Read Only Memory
CPU—Central Processing Unit
CSIM—CDMA Subscriber Identity Module
DVD—Digital Video Disk
DVD-ROM—Digital Video Disk-Read Only Memory
EEPROM—Electrically Erasable Programmable Read Only Memory
eHRPD—Enhanced High Rate Packet Data
GSM—Global System for Mobile Communications
HSPA—High Speed Packet Access
IMS—IP Multimedia Subsystem
IP—Internet Protocol
IPv4—Internet Protocol version 4
IPv6—Internet Protocol version 6
IR—InfraRed
ISIM—IP Multimedia Services Identity Module
LTE—Long Term Evolution
MDN—Mobile Directory Number
MEID—Mobile Equipment Identifier
OTA—Over the Air
OMA-DM—Open Mobile Alliance-Device Management
PC—Personal Computer
PDA—Personal Digital Assistant
PDN—Packet Data Network
PROM—Programmable Read Only Memory
PSTN—Public Switched Telephone Network
QoS—Quality of Service
RAM—Random Access Network
RAN—Radio Access Network
RF—Radio Frequency
ROM—Read Only Memory
SIM—Subscriber Identity Module
SoC—System On Chip
UICC—Universal Integrated Circuit Card
UMTS—Universal Mobile Telecommunications Systems
USIM—Universal Subscriber Identity Module
XCVR—Transceiver

What is claimed is:

1. A Universal Integrated Circuit Card (UICC), comprising:
an interface for exchange of messages with a user device portion of a mobile station;
memory for storing information; and
a processor coupled to the interface and the memory;
wherein:
the processor is configured to:
monitor the interface for arrival of event messages indicating occurrence of events in the life of data call connections for the mobile station via a mobile communication network, an event message being sent from the user device without being triggered by the UICC,
receive the event messages from the user device via the interface, and
process the received event messages for operation of the UICC; and
the event messages received from the user device via the interface include a data call in-progress event message generated when either the UICC or an application running on the user device portion of the mobile station requests a data call, while another data call connection with the mobile communication network is already in progress.

2. The UICC of claim 1, wherein the event messages received from the user device portion of the mobile station via the interface include a data call connected event message generated when the mobile station successfully completes a data attach procedure with the mobile communication network.

3. The UICC of claim 1, wherein the event messages received from the user device portion of the mobile station via the interface include a data call disconnected event message generated when the mobile station loses a previously established data call connection with the mobile communication network.

4. The UICC of claim 1, wherein the processor of the UICC is further configured to, based on the received event messages, determine statuses of the data call connections for the mobile station.

5. The UICC of claim 1, wherein each of the event messages includes an event type and associated parameters.

6. The UICC of claim 5, wherein the event type is one of: Data Call Connected, Data Call Disconnected, and Data Call In Progress.

7. The UICC of claim 5, wherein the associated parameters include at least one of: a type of network, a type of Internet Protocol (IP) connection, or an Access Point Name (APN).

8. A user device configured to form a mobile station together with a Universal Integrated Circuit Card (UICC), wherein the user device comprises:
at least one processor; and
a message interface for communication between the at least one processor and the UICC,
wherein:
the at least one processor is configured to:
detect occurrence of events in the life of data call connections for the mobile station via a mobile communication network, and
generate and supply to the UICC, through the message interface and without being triggered by the UICC, event messages indicating the occurrence of each detected event; and
the event messages include a data call in-progress event message generated when either the UICC or an application running on the user device requests a data call connection, while another data call connection with the mobile communication network is already in progress.

9. The user device of claim 8, wherein the at least one processor includes a baseband processor for processing digitized representations of baseband signals for radio frequency communication to and from the mobile station over the air with a mobile communication network.

10. The user device of claim 8, wherein the event messages include a data call connected event message generated when the mobile station successfully completes a data attach procedure with the mobile communication network.

11. The user device of claim 8, wherein the event messages include a data call disconnected event message generated when the mobile station loses a previously established data call connection with the mobile communication network.

12. A mobile station comprising:
a baseband processor;
a Universal Integrated Circuit Card (UICC);
one or more user interface elements; and a processor coupled to the baseband processor, the UICC and the one or more user interface elements, configured to control operations of the mobile station, wherein:

the baseband processor is configured to generate and supply to the UICC event messages each indicating the occurrence of a different event in the life of a data call connection for the mobile station via a mobile communication network, the event messages are generated and supplied by the baseband processor without being triggered by the UICC, the UICC is configured to wait for and receive from the baseband processor the event messages; and the event messages generated by the baseband processor include a data call in-progress event message that is generated by the baseband processor when the UICC requests a data call, while another data call connection with the mobile communication network is already in progress.

13. The mobile station of claim 12, wherein the event messages from the baseband processor include a data call connected event message that is generated by the baseband processor when the mobile station successfully completes a data attach procedure with a mobile communication network.

14. The mobile station of claim 12, wherein the event messages from the baseband processor include a data call disconnected event message that is generated by the baseband processor when the mobile station loses a previously established data call connection with the mobile communication network.

15. The mobile station of claim 12, wherein a mobile client application running on the processor is configured to receive from the baseband processor the messages indicating occurrence of the events in the life of data call connections for the mobile station via the mobile communication network.

16. The mobile station of claim 12, wherein the event messages from the baseband processor further include:

a data call connected event message generated by the baseband processor when the mobile station successfully completes a data attach procedure with the mobile communication network; and a data call disconnected event message generated by the baseband processor when the mobile station loses a previously established data call connection with the mobile communication network.

17. The mobile station of claim 12, wherein each of the event messages includes an event type and associated parameters.

18. The mobile station of claim 17, wherein the event type is one of: Data Call Connected, Data Call Disconnected, and Data Call In Progress.

19. The mobile station of claim 17, wherein the associated parameters include at least one of: a type of network, a type of Internet Protocol (IP) connection, or an Access Point Name (APN).

* * * * *